US008353559B2

(12) United States Patent
Williams et al.

(10) Patent No.: US 8,353,559 B2
(45) Date of Patent: Jan. 15, 2013

(54) INCLINATION ADJUSTMENT MECHANISM FOR A BASE OF SAFETY SEAT

(75) Inventors: Bruce Williams, Narvon, PA (US); Andrew Lehman, Lancaster, PA (US); Scott Anderson, East Earl, PA (US)

(73) Assignee: Lerado (Zhong Shan) Industrial Co., Ltd., Zhong Shan, Guang Dong Province (CN)

( * ) Notice: Subject to any disclaimer, the term of this patent is extended or adjusted under 35 U.S.C. 154(b) by 116 days.

(21) Appl. No.: 13/005,454

(22) Filed: Jan. 12, 2011

(65) Prior Publication Data

US 2011/0169309 A1    Jul. 14, 2011

(30) Foreign Application Priority Data

Jan. 13, 2010 (CN) .................... 2010 2 0000766 U

(51) Int. Cl.
*A47D 1/00* (2006.01)
(52) U.S. Cl. ................................ 297/256.13
(58) Field of Classification Search ............... 297/256.1, 297/256.13, 256.16
See application file for complete search history.

(56) References Cited

U.S. PATENT DOCUMENTS

| 5,181,761 | A  | * | 1/1993  | Meeker .................. 297/256.13 |
| 7,006,536 | B1 | * | 2/2006  | Somashekhar et al. ....... 370/538 |
| 7,207,628 | B2 | * | 4/2007  | Eros ............................. 297/297 |
| 8,070,226 | B2 | * | 12/2011 | Dingler et al. ........... 297/256.11 |
| 2007/0057546 | A1 | * | 3/2007 | Chen et al. ............... 297/256.13 |

* cited by examiner

*Primary Examiner* — David Dunn
*Assistant Examiner* — Timothy J Brindley
(74) *Attorney, Agent, or Firm* — Morris Manning & Martin, LLP; Tim Tingkang Xia, Esq.

(57) ABSTRACT

An inclination adjustment mechanism for a base of safety seat includes a base, a heelpiece and a spring-loaded press button. The base has one end formed with a plurality of positioning indents, and a upper surface for supporting a safety seat. The heelpiece is pivoted to the base and formed with a protruded portion for selectively engaging with one of the positioning indents thereby to keep the base in a selected inclination position. The spring-loaded press button is operatively connected to one end of the heelpiece for releasing the protruded portion from the positioning indents, so as to change the selected inclination position of the base by pressing the spring-loaded press button and moving one end of the base relative to the heelpiece.

10 Claims, 5 Drawing Sheets

INCLINATION ADJUSTMENT MECHANISM FOR A BASE OF SAFETY SEAT

CROSS-REFERENCE TO RELATED APPLICATIONS

This non-provisional application claims priority under 35 U.S.C. §119(a) on Patent Application No(s). 201020000766.7 filed in People's Republic of China on Jan. 13, 2010, the entire contents of which are hereby incorporated by reference.

FIELD OF THE INVENTION

The present invention relates generally to an inclination adjustment mechanism for a base of safety seat.

BACKGROUND OF THE INVENTION

Child safety seats and infant carriers are in wide use. More and more countries require baby and infant to use child safety seats and infant carriers in vehicle. However, to install a child safety seats or infant carriers onto the vehicle seat by original safety belt is always a hard work to the user, accompanying many troublesome problem and waste of time.

Child safety seats and/or infant carriers may be secured to the vehicle seat by a locking mechanism onto a base. Traditional base can not be adjusted with its inclination; therefore the little occupant may not obtain a comfortable angle to sit or lay down to fall asleep, according its feeling and mood which may change in any time.

SUMMARY OF THE INVENTION

For improving to the shortcoming of traditional base, the present invention provides an inclination adjustment mechanism, which includes a base, a heelpiece and a spring-loaded press button. The base has one end formed with a plurality of positioning indents, and a upper surface for supporting a safety seat. The heelpiece is pivoted to the base and formed with a protruded portion for selectively engaging with one of the positioning indents thereby to keep the base in a selected inclination position. The spring-loaded press button is operatively connected to one end of the heelpiece for releasing the protruded portion from the positioning indents, so as to change the selected inclination position of the base by pressing the spring-loaded press button and moving one end of the base relative to the heelpiece.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
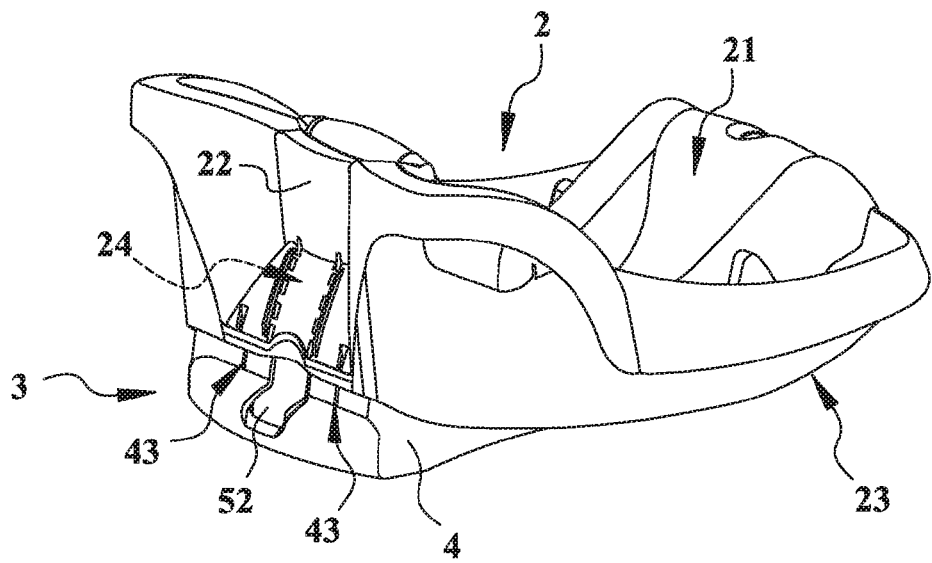
FIG. 1 is a perspective view showing the embodiment of inclination adjustment mechanism for a base of safety seat.
Figure 2:
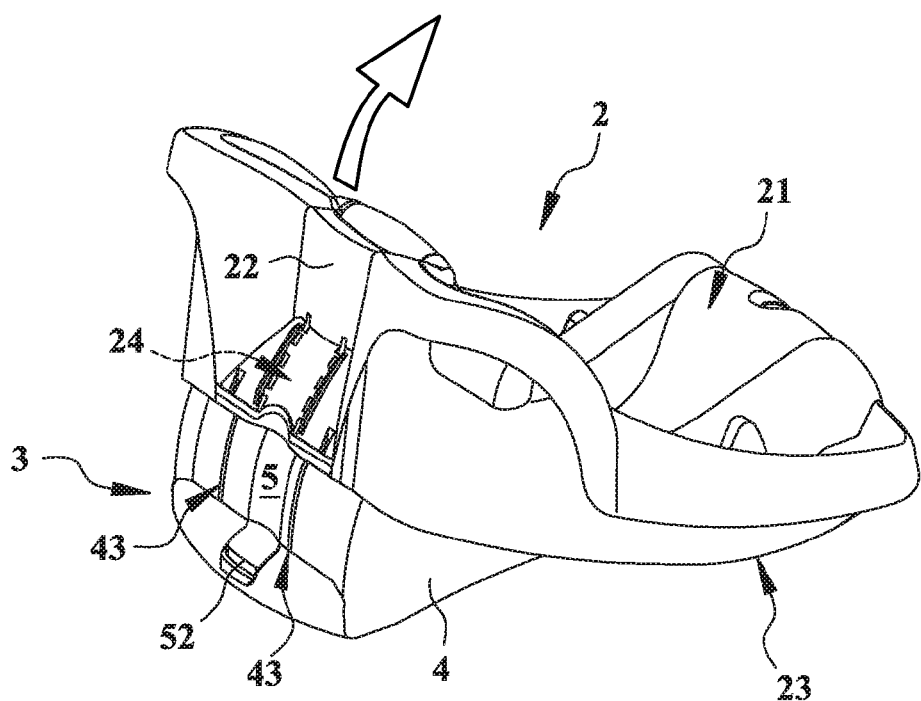
FIG. 2 is a schematic perspective view showing the base of safety seat being increased its inclination adjusted by manipulation of the inclination adjustment mechanism of the present invention.
Figure 3:
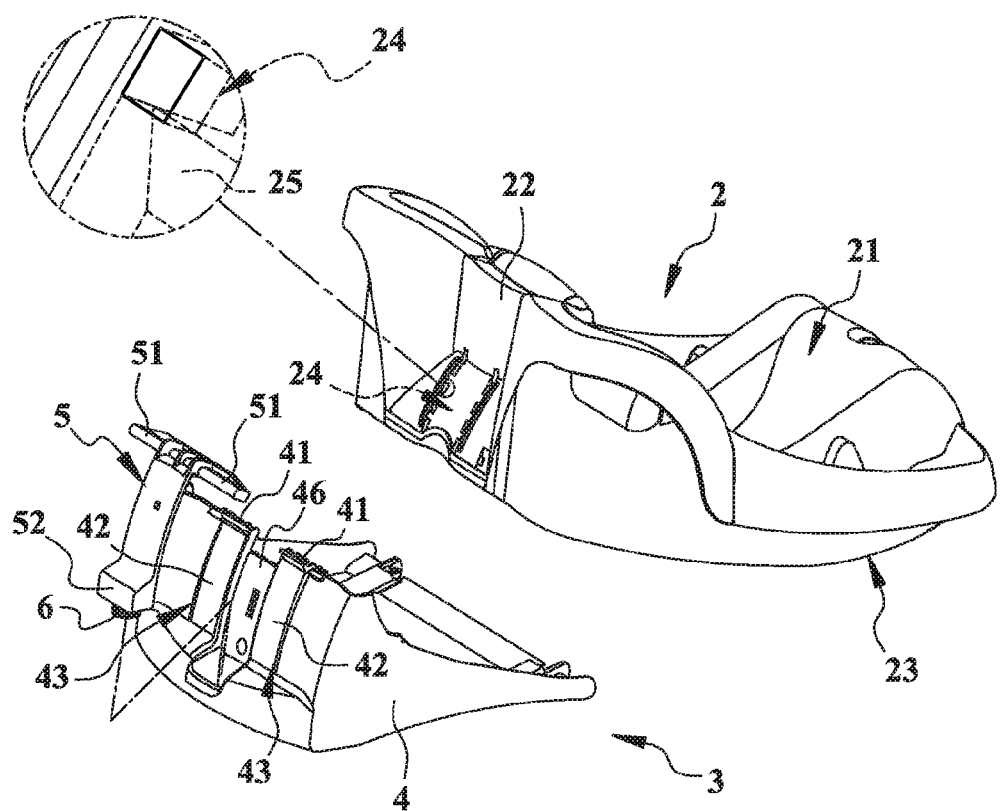
FIG. 3 is exploded perspective view showing the structure of the inclination adjustment mechanism.

Referring to FIGS. 1 to 3, the embodiment of the inclination adjustment mechanism 3 according to the present invention includes a base 2, a heelpiece 4 and a spring-loaded press button 5.

Figure 7:
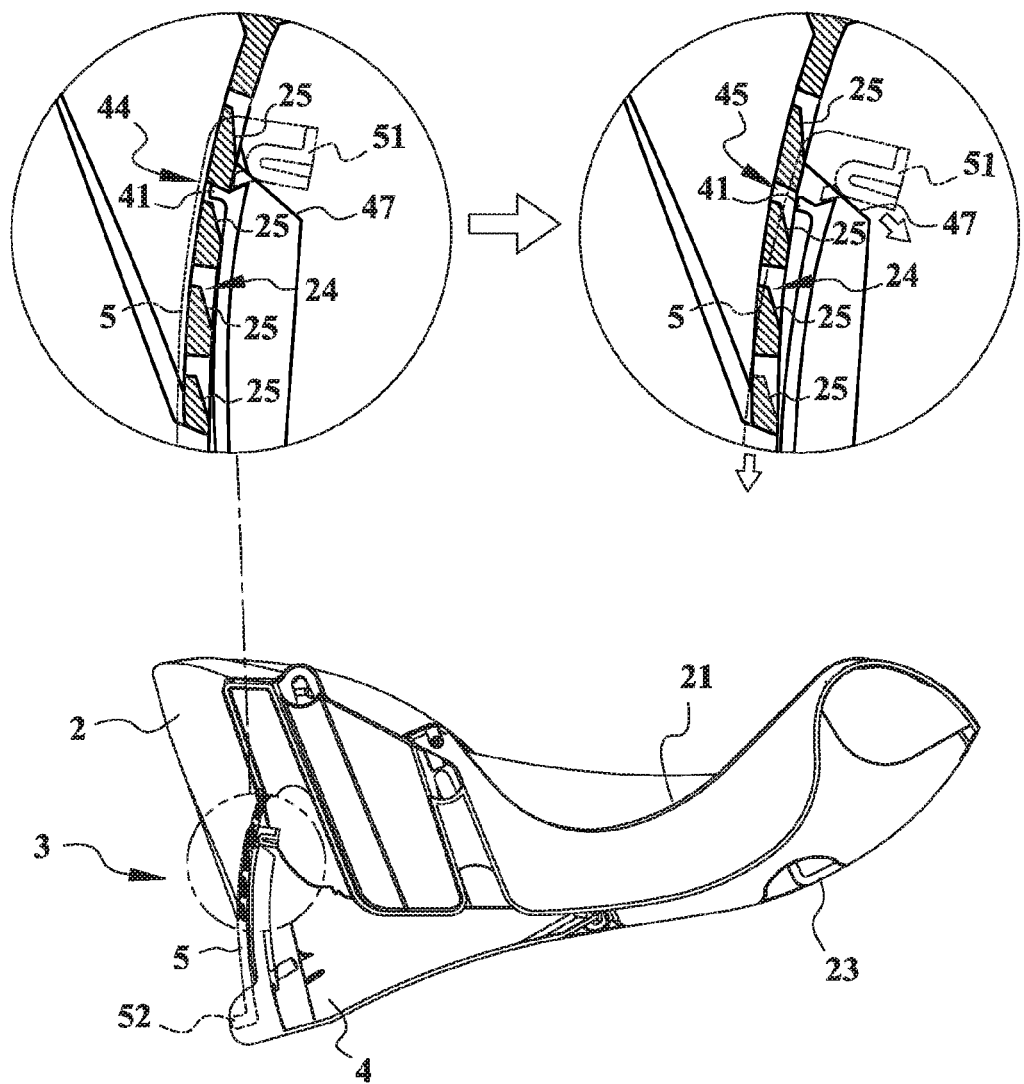
FIG. 7 is a schematic cross-sectional view showing the operation of the inclination adjustment mechanism.

Referring to FIGS. 3 and 7, the base 2 has one end 22 formed with a plurality of positioning indents 24 on the inner side, an upper surface 21 for supporting a safety seat (not shown) and an under side 23 for pivoting with the heelpiece 4.

The heelpiece 4 is pivoted to the base 2 at the under side 23 and formed with a protruded portion 41 for selectively engaging with one of the positioning indents 24 thereby to keep the base 2 in a selected inclination position.

Preferably, the plurality of positioning indents 24 each can further be formed with a slant 25 in one direction that can permit one end the base 2 to move upward without pressing the spring-loaded press button 5.

The heelpiece 4 may have an elastic section 42 connected with the protruded portion 41 for providing a biasing force to keep the protruded portion 41 engaging with one of the plurality of positioning indents 24. Preferably, the elastic section 42 may be formed integrally with the protruded portion 41, and the elastic section 42 may be formed with at least an elongated slot 43 for providing more flexibility and elasticity. Further, a middle portion 46 between the two elongated slot 43 can be used for slidably supporting the spring-loaded press button 5.

The spring-loaded press button 5 is biased by a compression spring 6 and operatively connected to one end of the heelpiece 4 for releasing the protruded portion 41 from the positioning indents 24, so as to change the selected inclination position of the base 2 by pressing the spring-loaded press button 5 and moving one end of the base 2 relative to the heelpiece 4.

Figure 4:
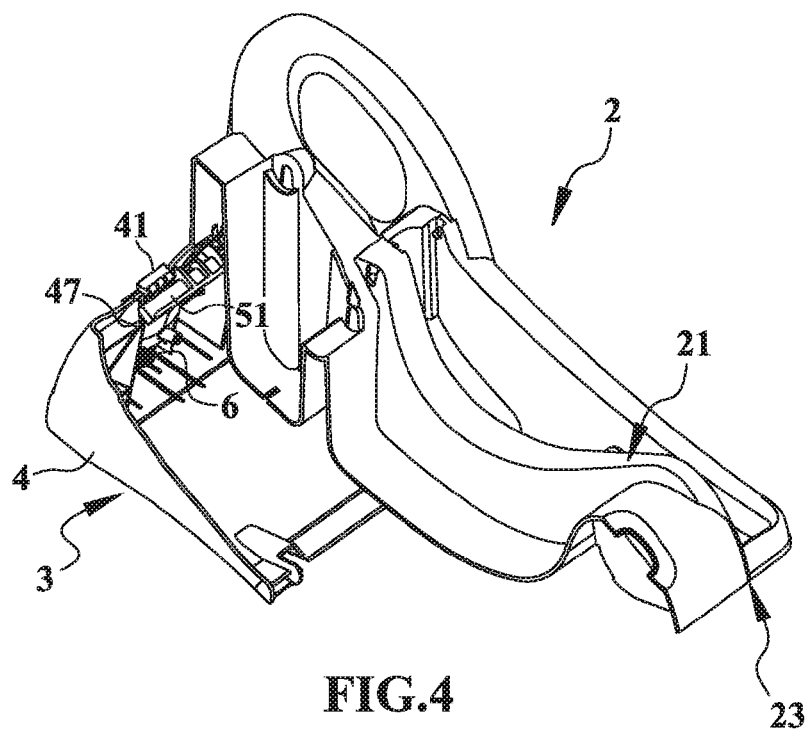
FIG. 4 is a partial cross-sectional view showing a portion of the inclination adjustment mechanism embodied in a base.
Figure 5:
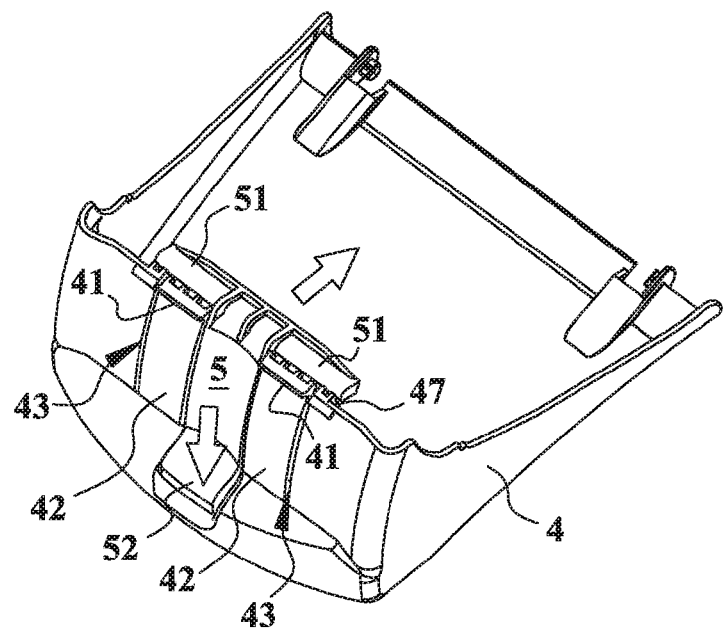
FIG. 5 is a perspective view showing another portion of the inclination adjustment mechanism embodied in a base.
Figure 6:
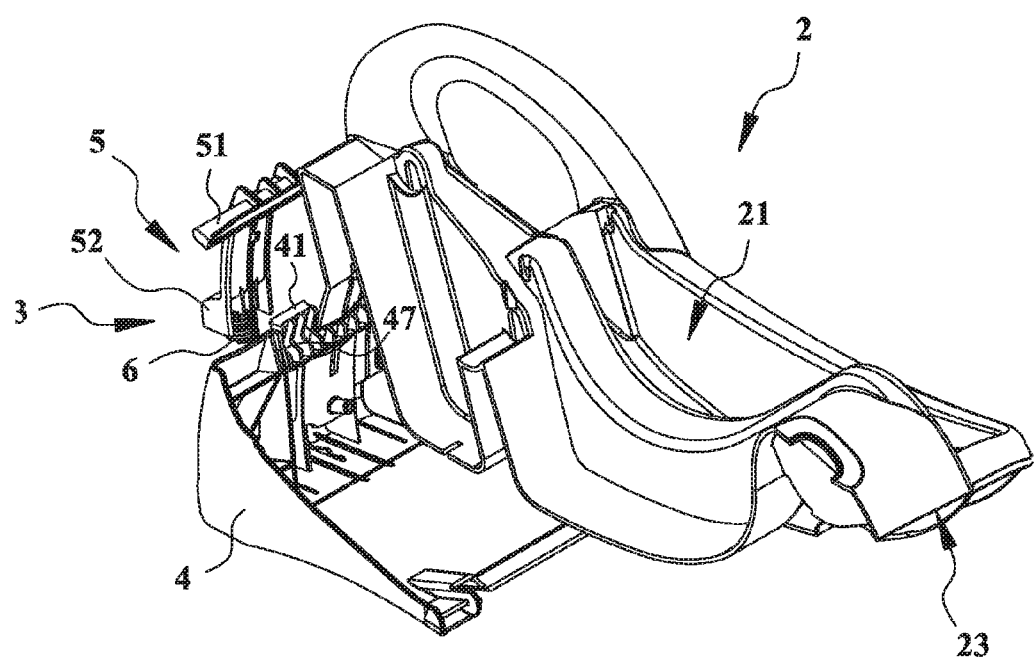
FIG. 6 is a partial cross-sectional view showing a spring-loaded button and the portion of the inclination adjustment mechanism embodied in the base.

Referring to FIGS. 4 to 6, the spring-loaded press button 5 may be movably mounted on one side of the middle portion 46. As shown in FIG. 5, the heelpiece 4 may be formed with at least a guiding slant 47 for guiding the spring-loaded press button 5 thereby to push the elastic section 42 and disengage the protruded portion 41 from the plurality of positioning indents 24.

The spring-loaded press button 5 has an upper end formed with at least a pushing arm 51 extended transversely and slidably abutted on and guided by the guiding slant 47, and has a lower end formed with a side extension 52 exposed near the bottom of the heelpiece 4 so as to be pressed by a user in a direction against the vehicle seat. The spring-loaded press button 5 moves the protruded portion 41 from an engaged position 44 to a released position 45 when being pressed downward to cause the pushing arm 51 sliding alone the guiding slant 47 thereby to push the elastic section 42 for disengaging the protruded portion 41 from the plurality of positioning indents 24.

While particular embodiments of the invention have been described, those skilled in the art will recognize that many modifications are possible that will achieve the same goals by substantially the same system, device or method, and where those systems, devices or methods still fall within the true spirit and scope of the invention disclosed.

What is claimed is:

1. An inclination adjustment mechanism for a base of safety seat, including:
    a base for supporting a safety seat, having one end formed with a plurality of positioning indents on the inner side thereof;
    a heelpiece pivoted to the base and formed with a protruded portion for selectively engaging with one of the positioning indents thereby to keep the base in a selected inclination position; and
    a spring-loaded press button mounted in a slot in the heelpiece, having a lower end formed with a side extension exposed near the bottom of the heelpiece so as to be pressed by a user in a direction against the vehicle seat, and operatively connected to one end of the heelpiece for releasing the protruded portion from the positioning indents, so as to change the selected inclination position of the base by pressing the spring-loaded press button and moving one end of the base relative to the heelpiece.

2. The inclination adjustment mechanism of claim 1, wherein the plurality of positioning indents each formed with a slant that permits the movement of one end of the base upward without pressing the spring-loaded press button.

3. The inclination adjustment mechanism of claim 1, wherein the heelpiece has an elastic section connected with the protruded portion for providing a biasing force to keep the protruded portion engaging with one of the plurality of positioning indents.

4. The inclination adjustment mechanism of claim 3, wherein the elastic section is formed integrally with the protruded portion.

5. The inclination adjustment mechanism of claim 3, wherein the elastic section is formed with at least an elongated slot for providing more flexibility and elasticity.

6. The inclination adjustment mechanism of claim 3, wherein the elastic section is formed with two elongated slots and a middle portion between the two elongated slot for slidably supporting the spring-loaded press button.

7. The inclination adjustment mechanism of claim 6, wherein the spring-loaded press button is movably mounted on one side of the middle portion.

8. The inclination adjustment mechanism of claim 7, wherein the heelpiece has at least a guiding slant for guiding the spring-loaded press button thereby to push the elastic section and disengage the protruded portion from the plurality of positioning indents.

9. The inclination adjustment mechanism of claim 8, wherein the spring-loaded press button has at least a pushing arm extended transversely at the upper end thereof for slidably abutting on and guided by the guiding slant.

10. The inclination adjustment mechanism of claim 9, wherein the spring-loaded press button moves the protruded portion from an engaged position to a released position when being pressed downward, that causes the pushing arm sliding along the guiding slant thereby to push the elastic section for disengaging the protruded portion from the plurality of positioning indents.

\* \* \* \* \*